(12) United States Patent
Kneib et al.

(10) Patent No.: US 11,829,316 B2
(45) Date of Patent: Nov. 28, 2023

(54) METHOD AND DEVICE FOR DETERMINING INFORMATION OF A BUS SYSTEM

(71) Applicant: Robert Bosch GmbH, Stuttgart (DE)

(72) Inventors: Marcel Kneib, Ingelheim (DE); Oleg Schell, Krautheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 226 days.

(21) Appl. No.: 17/328,684

(22) Filed: May 24, 2021

(65) Prior Publication Data

US 2022/0043768 A1 Feb. 10, 2022

(30) Foreign Application Priority Data

Aug. 10, 2020 (DE) .......................... 102020210096.9

(51) Int. Cl.
*G06F 13/42* (2006.01)
*G06F 21/60* (2013.01)

(52) U.S. Cl.
CPC ............ *G06F 13/42* (2013.01); *G06F 21/604* (2013.01)

(58) Field of Classification Search
None
See application file for complete search history.

(56) References Cited

U.S. PATENT DOCUMENTS

| | | | |
|---|---|---|---|
| 7,492,316 B1* | 2/2009 | Ameti | G01S 5/021 342/465 |
| 7,924,160 B1* | 4/2011 | LaPenta | G08B 13/2422 340/539.13 |
| 7,932,847 B1* | 4/2011 | Hsieh | G04F 10/005 341/155 |
| 2003/0062473 A1* | 4/2003 | Weinberger | H01J 49/40 250/282 |
| 2003/0111597 A1* | 6/2003 | Gonin | H01J 49/025 250/397 |
| 2003/0210028 A1* | 11/2003 | Beach | G01R 31/31937 324/76.16 |
| 2004/0000986 A1* | 1/2004 | Ott | G01S 13/84 340/541 |
| 2004/0108954 A1* | 6/2004 | Richley | G01S 5/0226 342/465 |
| 2010/0141328 A1* | 6/2010 | Meninger | H03L 7/0816 327/512 |

(Continued)

*Primary Examiner* — Lonnie V Sweet
(74) *Attorney, Agent, or Firm* — NORTON ROSE FULBRIGHT US LLP; Gerard Messina

(57) ABSTRACT

A method, particularly a computer-implemented method, for determining information of a bus system that has a transmission medium via which signals are transmittable. The method includes: determining a first variable which characterizes a time difference between a first point in time and a second point in time, a signal output by a transmitter onto the transmission medium of the bus system reaching a first position relative to the transmission medium at the first point in time, and the signal output by the transmitter onto the transmission medium of the bus system reaching a second position relative to the transmission medium at the second point in time; evaluating the first variable, at least one time-to-digital converter device being used for determining the first variable.

19 Claims, 5 Drawing Sheets

(56) References Cited

U.S. PATENT DOCUMENTS

| | | | |
|---|---|---|---|
| 2012/0068077 A1* | 3/2012 | Frach | H03M 1/0827 250/369 |
| 2012/0092644 A1* | 4/2012 | Spruck | G01S 17/36 356/5.01 |
| 2022/0173936 A1* | 6/2022 | Kneib | H04L 12/40058 |
| 2022/0174073 A1* | 6/2022 | Kneib | H04L 12/40039 |

* cited by examiner

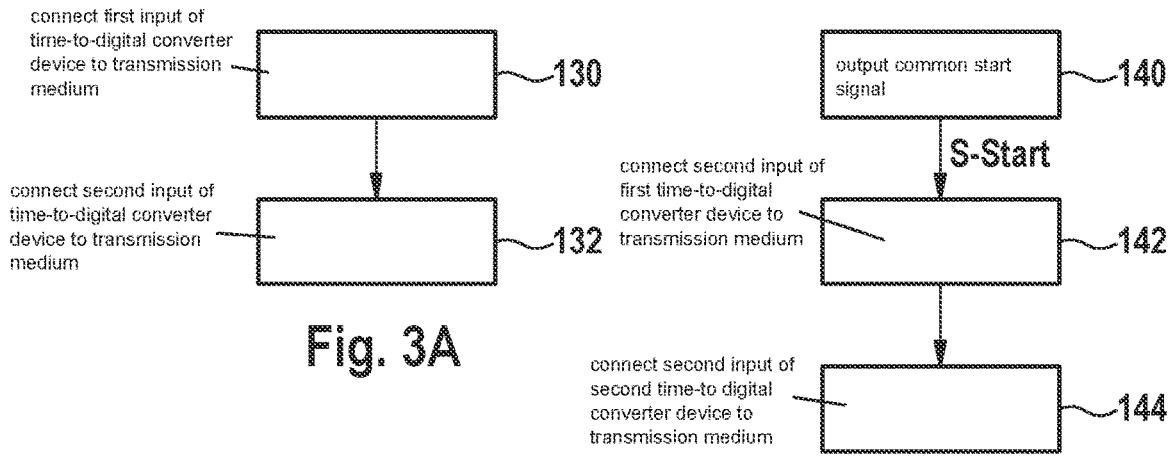
Fig. 3A
Fig. 3B
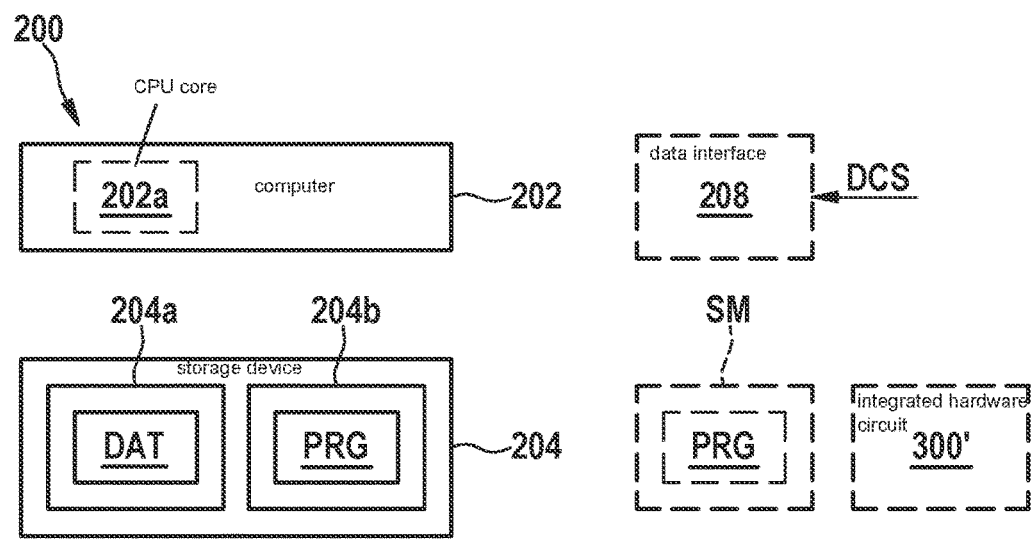
Fig. 4

METHOD AND DEVICE FOR DETERMINING INFORMATION OF A BUS SYSTEM

CROSS REFERENCE

The present application claims the benefit under 35 U.S.C. § 119 of German Patent Application No. DE 102020210096.9 filed on Aug. 10, 2020, which is expressly incorporated herein by reference in its entirety.

BACKGROUND INFORMATION

The present invention relates to a method for determining information of a bus system.

The present invention also relates to a device for determining information of a bus system.

SUMMARY

Exemplary embodiments of the present invention relate to a method, especially a computer-implemented method, for determining information of a bus system that has a transmission medium via which signals are transmittable. In accordance with an example embodiment of the present invention, the method includes: Determining a first variable which characterizes a time difference between a first point in time and a second point in time, a signal output by a transmitter onto the transmission medium of the bus system reaching a first position relative to the transmission medium at the first point in time, and the signal output by the transmitter onto the transmission medium of the bus system reaching a second position relative to the transmission medium at the second point in time; evaluating the first variable, at least one time-to-digital converter device being used, for example, for determining the first variable. In further exemplary embodiments, this allows particularly efficient determination of the first variable.

In other words, the first variable in exemplary embodiments characterizes a time difference between the arrival of a/the signal output by a/the transmitter onto the transmission medium of the bus system at a/the first position relative to the transmission medium and the arrival of a/the signal output by a/the transmitter onto the transmission medium of the bus system at a/the second position relative to the transmission medium. In further exemplary embodiments, the first variable may also be referred to as propagation difference or propagation-time difference.

For example, the first position differs from the second position. In addition, for instance, a position of the transmitter differs from the first position and from the second position.

In further exemplary embodiments, alternatively or in addition to the time-to-digital converter device, another device may be used to determine the first variable, which in further exemplary embodiments may also take the form of a hardware circuit or (discrete) logic circuit, for example.

In other exemplary embodiments, the bus system includes one of the following types: CAN, CAN FD, CAN XL, 10BASET1S, LIN, FlexRay, MOST, KNX, LSN, ARINC-Bus, MIL-Bus, other types.

In additional exemplary embodiments, the method also includes: At least temporary connection of a first input, e.g., START input, of the time-to-digital converter device to the transmission medium at the first position, and at least temporary connection of a second input, e.g., STOP input, of the time-to-digital converter device to the transmission medium at the second position.

In further exemplary embodiments, the time-to-digital converter device is designed to determine a time difference between a change of state of an input signal at a first input, e.g., the START input, and a change of state of an input signal at a second input, e.g., the STOP input, and to output information characterizing the time difference, e.g., via a digital interface, that is, as a digital value.

In other exemplary embodiments of the present invention, the change of state of the input signal at the first and/or second input is a rising edge, e.g., of a corresponding pulse, or a falling edge, or any other perceptible change of the input signal.

In additional exemplary embodiments of the present invention, for example, a rising edge of a signal transmitted over the bus system may also be used as change of state of the input signal for the time-to-digital converter device. In further exemplary embodiments of the present invention, the signal may also be associated with a message, for example, which is transmitted over the bus system. For instance, the signal may characterize at least a portion of the message.

In further exemplary embodiments of the present invention, at least two time-to-digital converter devices are used to determine the first variable. This yields additional degrees of freedom in determining the first variable.

In other exemplary embodiments of the present invention, the method also includes: Output of one common start signal to a first time-to-digital converter device and to a second time-to-digital converter device; at least temporary connection of a second input, e.g., STOP input, of the first time-to-digital converter device to the transmission medium at the first position and at least temporary connection of a second input, e.g., STOP input, of the second time-to-digital converter device to the transmission medium at the second position. It is thereby possible for the first and second time-to-digital converter devices to receive the common start signal simultaneously, while corresponding signals are usable as STOP signal on the transmission medium at the first and second position, respectively. In other words, in further exemplary embodiments, the first time-to-digital converter device is usable to determine a propagation time of a signal from the point in time of the start signal to the first position, and the second time-to-digital converter device is usable to determine a propagation time of a or the (e.g., the same) signal from the point in time of the start signal to the second position. For example, the first variable may be determined from the time differences ascertainable with the aid of the respective time-to-digital converter devices.

In further exemplary embodiments of the present invention, the method also includes: Determining a model and/or reference data for at least one transmitter which is connectable to the transmission medium at a pre-definable position, the model and/or the reference data characterizing the first variable of the at least one transmitter, for example.

For instance, for a pre-definable bus system having a number of bus users that also operate at least occasionally as transmitters, in additional exemplary embodiments, individual first variables may be determined for the bus users, thus, e.g., the propagation-time differences of their signal with respect to the first and second position described above. To that end, for instance, each bus user may transmit at least one pre-definable message via the bus system, whose arrival at the first and second positions is usable as START or STOP signal for respective inputs of the at least one time-to-digital converter device.

In further exemplary embodiments of the present invention, for example, the first variables may be determined in a secure environment such as a production facility or a servicing center, for instance. This ensures that the first variables or propagation-time differences determined are correct and are not manipulated, for example.

In other exemplary embodiments of the present invention, the first variables may also be determined outside of a secure environment, in doing so, for example, messages being used that are secured cryptographically (e.g., signed digitally by the bus user or (at least partially) encrypted). Then, in further exemplary embodiments, by optional evaluation of at least a portion of the message content, it is possible to ensure that the signal or message in question actually traces back to the specific bus user and has not been sent by an attacker, for example, which has connected to the bus system without authorization (and/or is manipulating an existing bus user).

In other exemplary embodiments of the present invention, for example, the model may have a value of the first variable, determined in the manner indicated above, for the at least one transmitter or bus user. In further exemplary embodiments, the model may in each case therefore assign a corresponding value for the first variable to a plurality of transmitters or bus users. In additional exemplary embodiments, the model may be used later, for example, during operation of the bus system in the field (e.g., installed in a target system such as a vehicle, e.g., motor vehicle) to compare a value of the first variable determined in the field to the value of the first variable from the model. If both values are at least essentially the same, (thus, for example, differ maximally from each other by a predefinable degree), then in further exemplary embodiments of the present invention, it may be inferred that a) the bus user or transmitter in question actually corresponds to the bus user or transmitter utilized for forming the model, and/or b) that the bus user or transmitter in question is located at the same position of the transmission medium as the bus user or transmitter that was utilized for forming the model.

In further exemplary embodiments of the present invention, the model may have a, e.g., unique or biunique assignment of the first variables to the respective bus users, which is realizable with the aid of a table, for instance.

In further exemplary embodiments of the present invention, the model may have a probability distribution which indicates, e.g., for at least one bus user, with what probability what values for the first variable are to be expected for the bus user in question.

In other exemplary embodiments of the present invention, the model may have a graph or tree, e.g., a decision tree.

In additional exemplary embodiments of the present invention, the evaluation of the first variable includes: Determining a position of the transmitter, e.g., relative to the transmission medium, based on the first variable, and/or checking the first variable against the model or the reference data. For example, in further exemplary embodiments, the checking may include a comparison of the, e.g., instantaneously ascertained first variable, to a value of the first variable from the model or the reference data.

In other exemplary embodiments of the present invention, the method also includes: Evaluating information characterized by the signal, for instance, extracting information of a message characterized by the signal. In other words, in the case of further exemplary embodiments, in addition to being used for the control, e.g., of the START input and/or the STOP input of the time-to-digital converter device, the signal may also be used to at least partially determine a message content (e.g., in the case of a CAN bus system, a CAN identifier) of a message associated with the signal or characterized by the signal.

In additional exemplary embodiments of the present invention, the method also includes: Determining, based on the information and the first variable, whether the transmitter of the signal is a device authorized to communicate over the bus system. In further exemplary embodiments, as an option, for example, digitally signed or encrypted messages or portions of messages which are difficult or impossible for an attacker to falsify, for instance, may be utilized for this.

In further exemplary embodiments of the present invention, if it has been determined that the transmitter of the signal is not a device authorized to communicate over the bus system (e.g., because a digital signature is not present or is invalid and/or because first variable G1 is not assignable to an authorized device such as an authorized bus user), then at least one countermeasure is initiated whose aim, for example, is to prevent a transmission of the transmitter and/or to declare it as invalid.

In other exemplary embodiments of the present invention, in the case of a CAN bus system, for example, a transmission of an, e.g., unauthorized transmitter may be prevented by transmission of an error data frame and/or by occupancy of the bus system (e.g., due to a message with higher priority being sent out repeatedly by a bus user or a device carrying out the method according to the specific embodiments).

For example, if the method is implemented on a system which connects a plurality of bus systems, then in further exemplary embodiments, non-forwarding of malicious messages may be realized. Put another way, in further exemplary embodiments, a transmission of an unauthorized transmitter may be curtailed or prevented, for example, because the corresponding messages of the transmission are not forwarded by a first bus system in which they appear, to another bus system.

Additional exemplary embodiments of the present invention relate to a device for carrying out the method according to the specific embodiments. For example, the device may take the form of a control unit, e.g., for a motor vehicle, or may be integrated into a control unit, e.g., for a motor vehicle.

Other exemplary embodiments of the present invention relate to a computer-readable storage medium, including commands which, upon execution by a computer, prompt the computer to carry out the method according to the specific embodiments.

Further exemplary embodiments of the present invention relate to a computer program, including commands which, upon execution of the program by a computer, prompt the computer to carry out the method according to the specific embodiments.

More exemplary embodiments of the present invention relate to a data-carrier signal which transmits and/or characterizes the computer program according to the specific embodiments of the present invention.

Additional exemplary embodiments of the present invention relate to a utilization of the method according to the specific embodiments and/or the device according to the specific embodiments and/or the computer-readable storage medium according to the specific embodiments and/or the computer program according to the specific embodiments and/or the data-carrier signal according to the specific embodiments for at least one of the following elements: a) Determining a position of a transmitter of the bus system; b) checking a position of a transmitter of the bus system; c)

providing an intrusion detection system and/or intrusion detection and prevention system; d) authenticating a transmitter of the bus system.

Further features, possibilities of application and advantages of the present invention are obtained from the following description of exemplary embodiments of the present invention, which are represented in the figures. In this context, all described or represented features, separately or in any combination, form the subject matter of the invention, regardless of their combination, formulation or representation in the description and/or in the figures.

BRIEF DESCRIPTION OF THE DRAWINGS

FIG. 3A shows schematically a simplified flowchart according to further exemplary embodiments of the present invention.

FIG. 3B shows schematically a simplified flowchart according to further exemplary embodiments of the present invention.

FIG. 4 shows schematically a simplified block diagram of a device according to further exemplary embodiments of the present invention.

DETAILED DESCRIPTION OF EXAMPLE EMBODIMENTS

Figure 1:
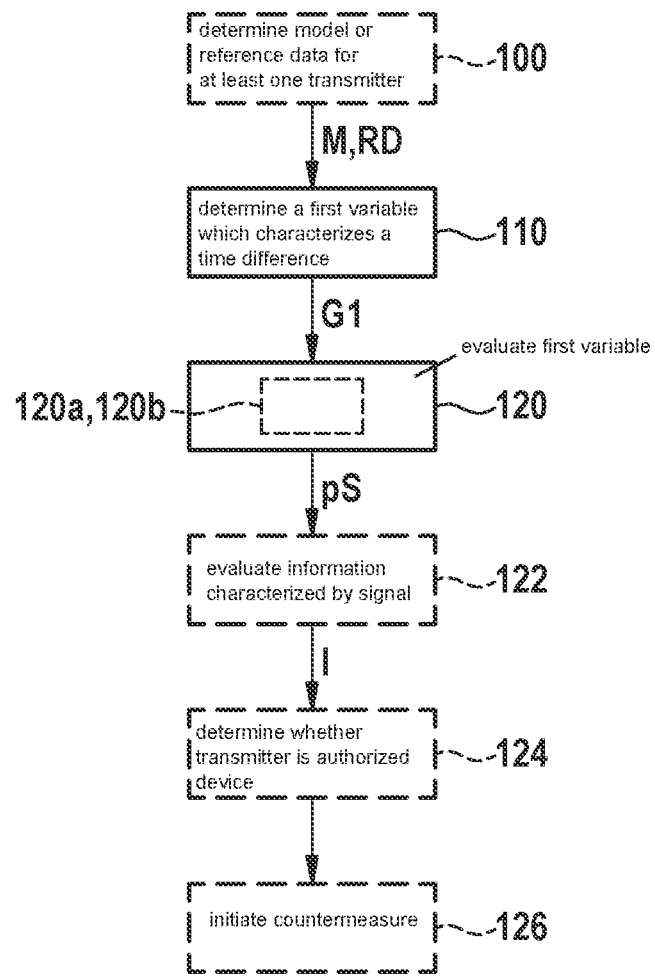
FIG. 1 shows schematically a simplified flowchart of a method according to exemplary embodiments of the present invention.

FIG. 1 shows schematically a simplified flowchart of a method, particularly a computer-implemented method, for determining information of a bus system 10 (see FIG. 2), which has a transmission medium 11 via which signals S, that are transmitted by a transmitter 5, for example, are able to be transmitted, according to exemplary embodiments of the present invention.

The method (see FIG. 1) includes: Determining 110 a first variable G1 which characterizes a time difference ZD (see also the exemplary time diagram according to FIG. 6) between a first point in time t1 and a second point in time t2, a signal S output by a transmitter 5 (FIG. 2) onto transmission medium 11 of bus system 10 reaching a first position p1 (FIG. 2) relative to transmission medium 11 at first point in time t1, and signal S output by transmitter 5 onto transmission medium 11 of bus system 10 reaching a second position p2 relative to transmission medium 11 at second point in time t2 (FIG. 6); evaluating 120 (FIG. 1) first variable G1, at least one time-to-digital converter device 300, 300-1 (see FIG. 2) being used for determining 110 first variable G1. In further exemplary embodiments, this permits particularly efficient determination of first variable G1.

Figure 2:
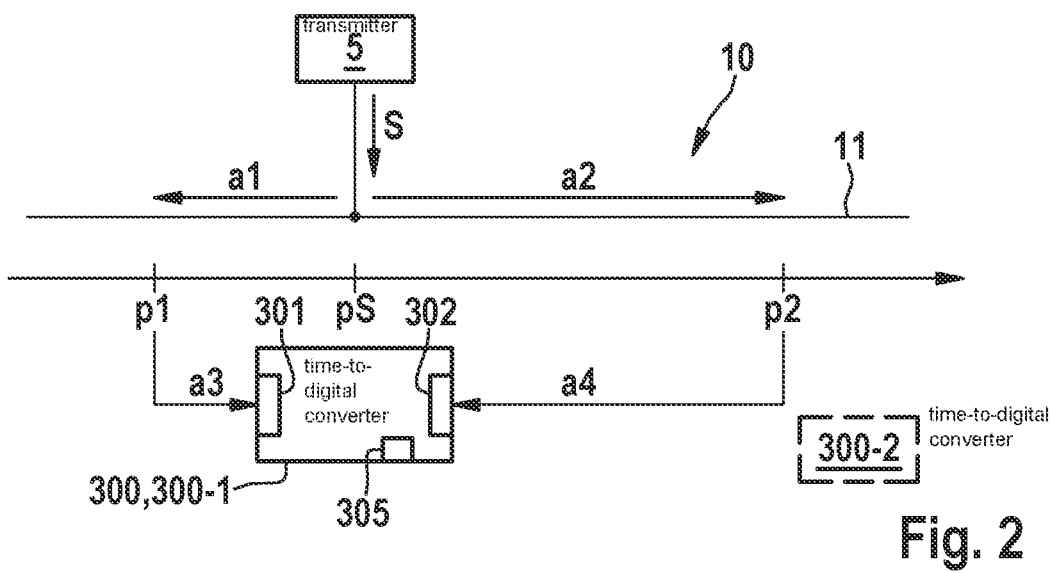
FIG. 2 shows schematically a simplified block diagram according to further exemplary embodiments of the present invention.
Figure 6:
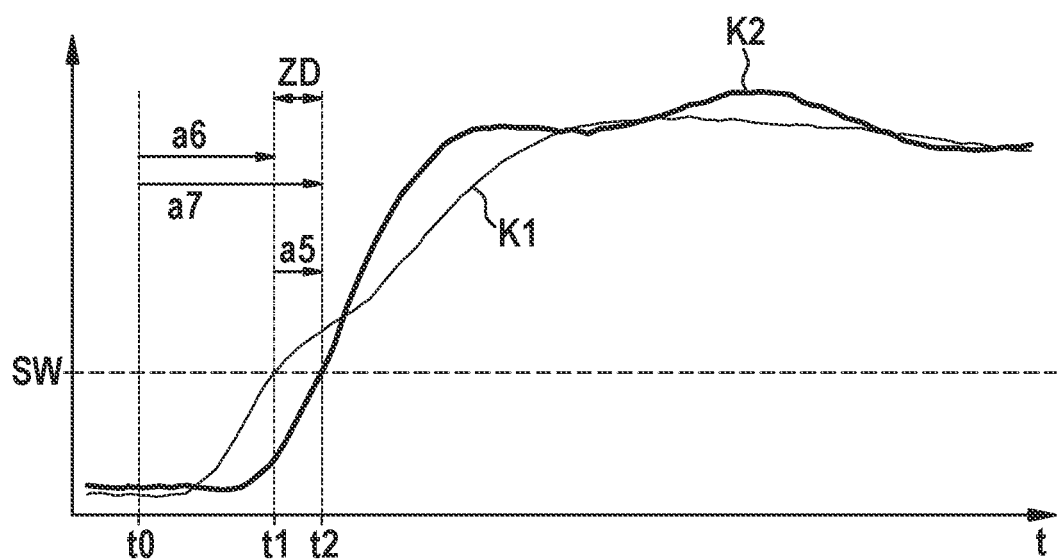
FIG. 6 shows schematically a simplified time diagram according to further exemplary embodiments of the present invention.

In other words, first variable G1 in exemplary embodiments characterizes a time difference between the arrival of a/the signal S output by a/the transmitter 5 (FIG. 2) onto transmission medium 11 of bus system 10 at a/the first position p1 relative to the transmission medium, and the arrival of a/the signal S output by a/the transmitter 5 onto transmission medium 11 of bus system 10 at a/the second position p2 relative to transmission medium 11. In other exemplary embodiments, the first variable may also be referred to as propagation difference or propagation-time difference. In FIG. 6, curve K1 symbolizes illustratively a time characteristic of a physical quantity, e.g., voltage between bus lines 11a, 11b (FIG. 2), as results at first position p1 on the basis of signal S sent out by transmitter 5 (FIG. 2), and curve K2 in FIG. 6 symbolizes illustratively a time characteristic of a physical quantity, e.g., voltage between bus lines 11a, 11b (FIG. 2), as results at second position p2 on the basis of signal S output by transmitter 5 (FIG. 2). Time difference ZD between first point in time t1 and second point in time t2 is likewise evident from FIG. 6.

For example, first position p1 (FIG. 2) differs from second position p2. In addition, for example, a position pS of the transmitter differs from first position p1 and from second position p2. Arrows a1, a2 in FIG. 2 indicate, by way of example, the signal paths which the signal, going out from transmitter 5, covers up to first position p1 (arrow a1) and to second position p2 (arrow 2a), respectively.

In further exemplary embodiments, bus system 10 includes one of the following types: CAN, CAN FD, CAN XL, 10BASET1S, LIN, FlexRay, MOST, KNX, LSN, ARINC-Bus, MIL-Bus, other types.

In further exemplary embodiments, transmission medium 11 is adapted for transmission of single-ended signals (see FIG. 2). In other exemplary embodiments, transmission medium 11 is adapted for transmission of differential signals (see FIG. 5), and to that end, may have two bus lines 11a, 11b, for example.

In additional exemplary embodiments (see FIG. 3A) the method also includes: At least temporary connection 130 of a first input 301 (FIG. 2), e.g., START input, of time-to-digital converter device 300 to transmission medium 11 at first position p1; at least temporary connection 132 (FIG. 3A) of a second input 302, e.g., STOP input, of time-to-digital converter device 300 to transmission medium 11 at second position p2.

In other exemplary embodiments, time-to-digital converter device 300 (FIG. 2) is designed to determine a time difference ZD (FIG. 6) between a change of state of an input signal (see, for example, curve K1 from FIG. 6) at a first input 301 (FIG. 2), e.g., the START input, and a change of state of an input signal (see, for example, curve K2 from FIG. 6) at a second input 302, e.g., the STOP input, and to output information characterizing time difference ZD, e.g., via a digital interface 305 (FIG. 2), that is, as a digital value.

In other exemplary embodiments, the change of state of the input signal at the first and/or second input is a rising edge, e.g., of a corresponding pulse, which results, for example, when the input signal in question exceeds a predefinable threshold value SW (FIG. 6). The (at least temporary) feed of the respective input signal from positions p1, p2 to inputs 301, 302 of time-to-digital converter device 300 is symbolized in FIG. 2 by arrows a3, a4.

In additional exemplary embodiments (not shown), for example, the change of state of the input signal at the first and/or second input may also be a falling edge, e.g., of a corresponding pulse, or any other perceptible or ascertainable change of the input signal. Reaching or failing to reach a threshold value may be used in these cases, for example.

In further exemplary embodiments, time-to-digital converter device 300 is connected by choice to transmission medium 11 of bus system 10, for example, if the intention is to carry out the method according to the specific embodiments.

In other exemplary embodiments, time-to-digital converter device 300 is disconnected by choice from transmission medium 11 of bus system 10 or is not connected to transmission medium 11, for example, if the method according to the specific embodiments is not to be carried out.

In further exemplary embodiments, a rising edge of a signal S transmitted over bus system 10 may also be used, for example, as change of state of the input signal for time-to-digital converter device 300, as is the case here by way of example in connection with curves K1, K2 according to FIG. 6. In other exemplary embodiments, signal S (FIG. 2) may also be associated with a message, for example, which is transmitted over bus system 10. As an example, signal S may characterize at least a portion of the message (e.g., in the case of a CAN bus system 10, a CAN message or CAN communication).

In additional exemplary embodiments (see FIG. 2), at least two time-to-digital converter devices 300-1, 300-2 are used to determine first variable G1. This yields additional degrees of freedom in determining first variable G1.

In further exemplary embodiments (see FIG. 3B), the method also includes: Output 140 of one common start signal S-START to a first time-to-digital converter device 300-1 (FIG. 2) and to a second time-to-digital converter device 300-2; at least temporary connection 142 (FIG. 3B) of a second input 302, e.g., STOP input, of first time-to-digital converter device 300-1 to transmission medium 11 (FIG. 2) at first position p1; at least temporary connection 144 of a second input 302, e.g., STOP input, of second time-to-digital converter device 300-2 to transmission medium 11 at second position p2. It is thereby possible for first and second time-to-digital converter devices 300-1, 300-2 to receive common start signal S-START simultaneously, while corresponding signals K1, K2 (FIG. 6) are usable as STOP signal on transmission medium 11 at the first and second position, respectively. In other words, in further exemplary embodiments, first time-to-digital converter device 300-1 is usable to determine a propagation time of a signal S from point in time t0 (FIG. 6) of start signal S-START to first position p1, and second time-to-digital converter device 300-2 is usable to determine a propagation time of a or the (e.g., the same) signal S from the point in time of start signal S-START to second position p2. For example, first variable G1 may be determined from the time differences ascertainable with the aid of respective time-to-digital converter devices 300-1, 300-2.

Arrows a6, a7 in FIG. 6 symbolize the corresponding signal propagation times between transmitter 5 (FIG. 2) and respective time-to-digital converter device 300-1, 300-2. On the other hand, arrow a5 from FIG. 6 symbolizes a signal propagation time as determinable if, for example, an exceedance of threshold value SW by first curve K1 (portion of signal S (FIG. 2) as determinable at first position p1) is used as START signal for a (e.g., single) time-to-digital converter device 300, and if, for example, an exceedance of threshold value SW by second curve K2 (portion of signal S (FIG. 2) as determinable at second position p2) is used as STOP signal for (e.g., single) time-to-digital converter device 300.

In other exemplary embodiments (see FIG. 1), the method also includes: Determining 100 a model M and/or reference data RD for at least one transmitter 5 (FIG. 2), which is connectable at a pre-definable position pS to transmission medium 11, model M and/or reference data RD characterizing first variable G1 of the at least one transmitter 5, for example.

For example, for a pre-definable bus system 10 having a number of bus users that also operate at least occasionally as transmitter 5, in additional exemplary embodiments, individual first variables G1 may be determined for the bus users, thus, e.g., the propagation-time differences of their signal with respect to first and second positions p1, p2 described above. To that end, for instance, each bus user may transmit at least one pre-definable message over bus system 10, whose arrival at first and second positions p1, p2 is usable as START signal or STOP signal for respective inputs 301, 302 of the at least one time-to-digital converter device 300.

For example, in further exemplary embodiments, the first variables, e.g., for model M or reference data RD may be determined in a secure environment such as, e.g., a production facility or a servicing center. This ensures that the first variables or propagation-time differences determined are correct and are not manipulated, for instance.

In other exemplary embodiments, for instance, the first variables may also be determined outside of a secure environment, in doing so, messages being used, for example, that are secured cryptographically (e.g., signed digitally by the bus user or (at least partially) encrypted). Then, in further exemplary embodiments, by optional evaluation of at least a portion of the message content, it is possible to ensure that signal S or the message in question actually traces back to the specific bus user and has not been sent by an attacker, for example, which has connected to bus system 10 without authorization (and/or is manipulating an existing bus user 5).

In additional exemplary embodiments, for example, model M may have a value of the first variable, determined in the manner indicated above (see, e.g., step 110 from FIG. 1), for the at least one transmitter or bus user. In further exemplary embodiments, model M may in each instance therefore assign a corresponding value for first variable G1 to a plurality of transmitters or bus users. In additional exemplary embodiments, model M may be used later, for example, during operation of bus system 10 in the field (e.g., installed in a target system such as a vehicle, e.g., motor vehicle) to compare a value of first variable G1 determined in the field, to the value of first variable G1 from model M. If both values are at least essentially the same, (thus, for example, differ maximally from each other by a predefinable degree), in further exemplary embodiments, it may be inferred that a) the bus user or transmitter 5 in question actually corresponds to the bus user or transmitter utilized for forming model M, and/or b) that the bus user or transmitter 5 in question is located at the same position pS of transmission medium 11 as the bus user or transmitter that was utilized for forming the model.

In additional exemplary embodiments, model M may have a, e.g., unique or biunique assignment of first variables G1 to the respective bus users, which is realizable with the aid of a table, for example.

In further exemplary embodiments, model M may have a probability distribution which indicates, e.g., for at least one bus user, with what probability what values for first variable G1 are to be expected for the bus user in question.

In other exemplary embodiments, model M may have a graph or tree, e.g., a decision tree.

In further exemplary embodiments (see FIG. 1), evaluation 120 of first variable G1 includes: Determining 120a a position pS of transmitter 5, e.g., relative to transmission medium 11 (for example, the position may correspond to an exemplary one-dimensional length coordinate viewed along transmission medium 11), based on first variable G1, and/or checking 120b first variable G1 against model M or reference data RD. For instance, in further exemplary embodiments, checking 120b may include a comparison of, e.g., instantaneously ascertained first variable G1, to a value of first variable G1 from model M and/or reference data RD.

In additional exemplary embodiments (see FIG. 1), the method also includes: Evaluating 122 information I characterized by signal S (FIG. 2), for instance, extracting information of a message characterized by signal S. In other words, in the case of further exemplary embodiments, in addition to being used for the control, e.g., of the START input and/or the STOP input of time-to-digital converter device 300 (see, e.g., curves K1, K2 according to FIG. 6), signal S may also be used to at least partially determine a message content (e.g., in the case of a CAN bus system, a CAN identifier) of a message associated with signal S or characterized by signal S.

In other exemplary embodiments, the method also includes: Determining 124, based on information I and first variable G1, whether transmitter 5 of signal S is a device authorized to communicate via bus system 10. In the case of further exemplary embodiments, as an option, for example, digitally signed or encrypted messages or parts of messages which are difficult or impossible for an attacker to falsify, for instance, may be utilized for this.

In additional exemplary specific embodiment, if it has been determined that transmitter 5 of signal S is not a device authorized to communicate via bus system 10 (e.g., because a digital signature is not present or is invalid and/or because first variable G1 is not assignable to an authorized device like, e.g., an authorized bus user, for instance, because a position pS of transmitter 5 derivable from first variable G1 does not match up with a known predefinable position of an authorized transmitter), then at least one countermeasure is initiated (see step 126), whose aim is, for example, to prevent a transmission of the transmitter and/or to declare it as invalid and/or not to forward the transmission.

For example, in the case of a CAN bus system 10, in further exemplary embodiments, transmission of an, e.g., unauthorized transmitter may be prevented by transmission of an error data frame and/or by occupancy of bus system 10 (e.g., due to a message with higher priority being sent out repeatedly by a bus user or by a device carrying out the method according to the specific embodiments).

Other exemplary embodiments (see FIG. 4) relate to a device 200 for carrying out the method according to the specific embodiments. For example, in further exemplary embodiments, device 200 may take the form of a control unit, e.g., for a motor vehicle, or may be integrated into a control unit, e.g., for a motor vehicle.

Device 200 has a computer 202 having at least one CPU core 202a, and a storage device 204, assigned to computer 202, for the at least temporary storage of at least one of the following elements: a) Data DAT (e.g., first variable(s) G1 and/or model M or reference data RD and/or at least one message and/or information derived or derivable from it; b) computer program PRG, especially for carrying out a method according to the specific embodiments.

In further exemplary embodiments, storage device 204 has a volatile memory 204a (e.g., random-access memory (RAM)), and/or a non-volatile memory 204b (e.g., flash-EEPROM).

In other exemplary embodiments, computer 202 has at least one of the following elements or takes the form of at least one of these elements: Microprocessor (pP), microcontroller (pC), application-specific integrated circuit (ASIC), system on chip (SoC), programmable logic module (e.g., FPGA, field programmable gate array), hardware circuit, or any combinations thereof.

Further exemplary embodiments relate to a computer-readable storage medium SM, including commands PRG which, upon execution by a computer 202, prompt the computer to carry out the method according to the specific embodiments.

Additional exemplary embodiments relate to a computer program PRG, including commands which, upon execution of the program by a computer 202, prompt the computer to carry out the method according to the specific embodiments.

Other exemplary embodiments relate to a data-carrier signal DCS which transmits and/or characterizes computer program PRG according to the specific embodiments. For example, data-carrier signal DCS is receivable via an optional data interface 208 of device 200.

Figure 5:
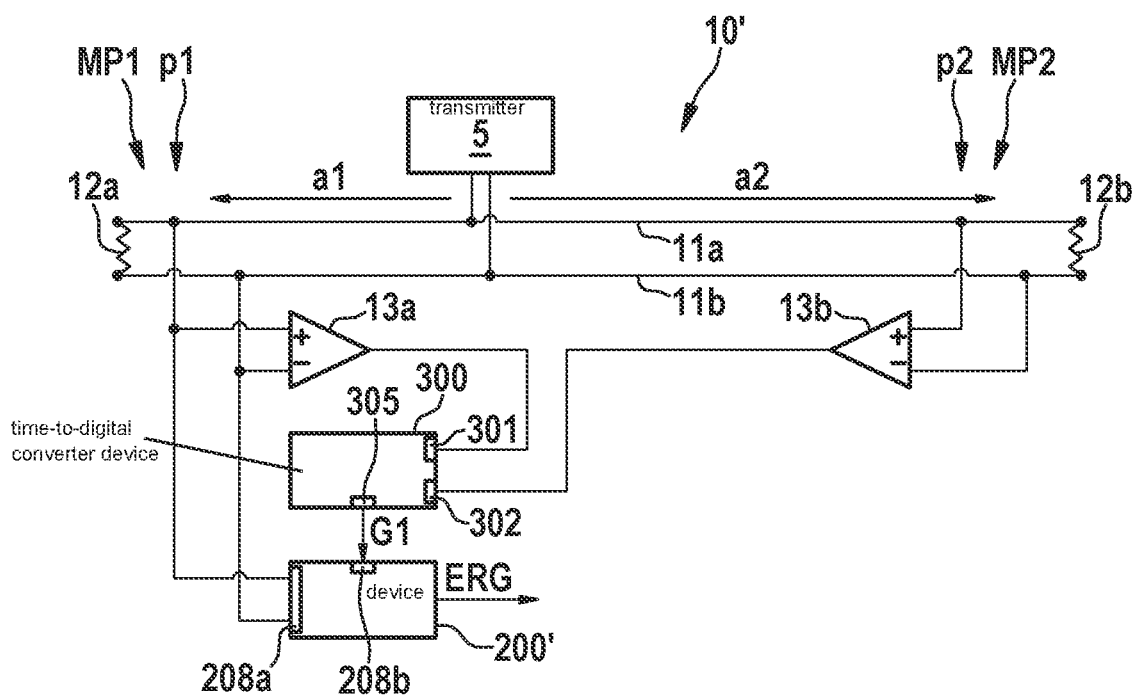
FIG. 5 shows schematically a simplified block diagram according to further exemplary embodiments of the present invention.

In other exemplary embodiments, data interface 208 may also be adapted to receive data from bus system 10 and/or to send out data onto bus system 10, for example, may have the functionality of a bus transceiver 208a (FIG. 5).

In further exemplary embodiments, device 200 may have the functionality of time-to-digital converter device 300, for example, by use of an integrated hardware circuit 300' which, e.g., may have the function of time-to-digital converter device 300 described illustratively above with reference to FIG. 2.

In other exemplary embodiments, at least one time-to-digital converter device 300, 300-1, 300-2 (FIG. 2) may also be integrated into device 200 (FIG. 4) (thus disposed on the same semiconductor substrate as components 202, 204, for instance) or may be assigned to it.

Further exemplary embodiments relate to a utilization of the method according to the specific embodiments and/or the device according to the specific embodiments and/or the computer-readable storage medium according to the specific embodiments and/or the computer program according to the specific embodiments and/or the data-carrier signal according to the specific embodiments for at least one of the following elements: a) Determining a position of a transmitter of the bus system; b) checking a position of a transmitter of the bus system; c) providing an intrusion detection system and/or intrusion detection and prevention system; d) authenticating a transmitter of the bus system.

FIG. 5 shows schematically a simplified block diagram of a bus system 10' according to further exemplary embodiments. For instance, bus system 10' takes the form of a CAN bus system, and has two bus lines 11a, 11b as transmission medium for the differential transmission of signals S. By way of example, in the present case, terminating resistors 12a, 12b are disposed at the respective ends of bus lines 11a, 11b, which terminate bus lines 11a, 11b in order to decrease reflections, for example. Optional differential amplifiers 13a, 13b supply time-to-digital converter device 300 with signals of bus system 11—able to be picked off from measuring positions MP1, MP2 that correspond, e.g., to positions p1, p2 according to FIG. 2—as respective input signals for a first (e.g., START-) input 301 and a second (e.g., STOP-) input 302 of time-to-digital converter device 300, for example. Time-to-digital converter device 300 is designed to determine first variable G1 and to output it in digital form, e.g., via an interface 305 to device 200', which has configuration 200 according to FIG. 4, for example, or a similar configuration.

For example, device 200' has a CAN bus transceiver 208a for receiving CAN messages from bus system 10, and a data interface 208b for receiving first variable G1 from time-to-digital converter device 300. In further exemplary embodiments, component 208 according to FIG. 4 may have at least one of interfaces 208a, 208b according to FIG. 5.

In other exemplary embodiments, instead of an optional differential amplifier 13a, 13b, a (CAN-) transceiver may also be used, for instance, in order, e.g., to generate a signal for the TDC.

Optionally, in the case of further exemplary embodiments, device 200' may output a result ERG determinable, e.g., based on first variable G1, for instance, information pS as determinable by evaluation 120 (FIG. 1) according to other exemplary embodiments. In further exemplary embodiments, result ERG may be output via interface 208 (FIG. 4), as well.

Figure 7:
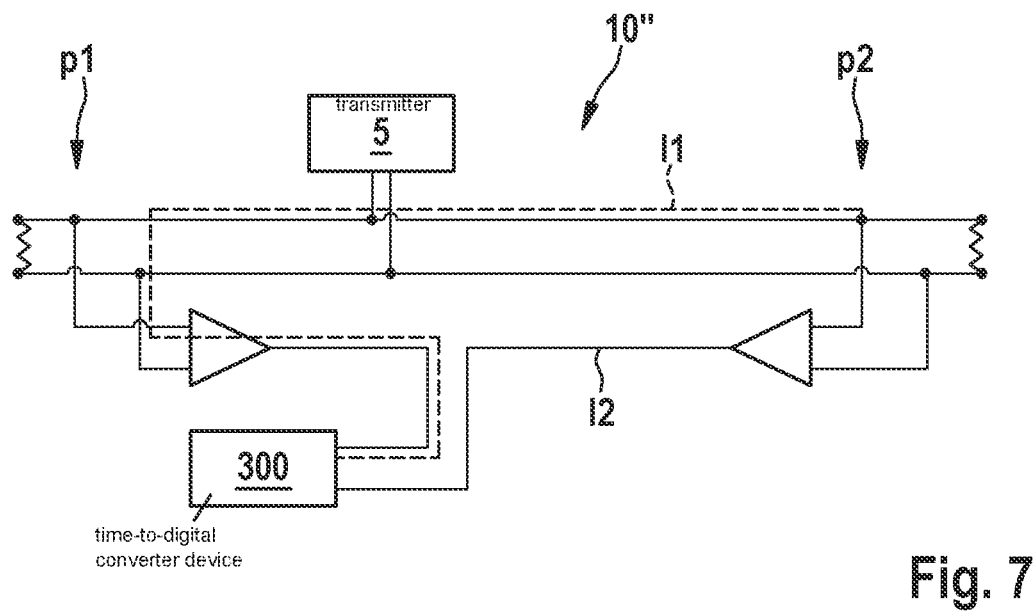
FIG. 7 shows schematically a simplified block diagram according to further exemplary embodiments of the present invention.

FIG. 7 shows schematically a simplified block diagram of a bus system 10" according to further exemplary embodiments. Depicted, by way of example, are line lengths 11, 12 as may come about in the case of a real implementation. In other exemplary embodiments, positions p1, p2 of the terminals of respective inputs 301, 302 (FIG. 2) of time-to-digital converter device 300 are selected in such a way that line length 11 is less than line length 12, so that, for example, a signal determinable via shorter line length 11 may provide the START signal and a signal determinable via longer line length 12 may provide the STOP signal.

Figure 8:
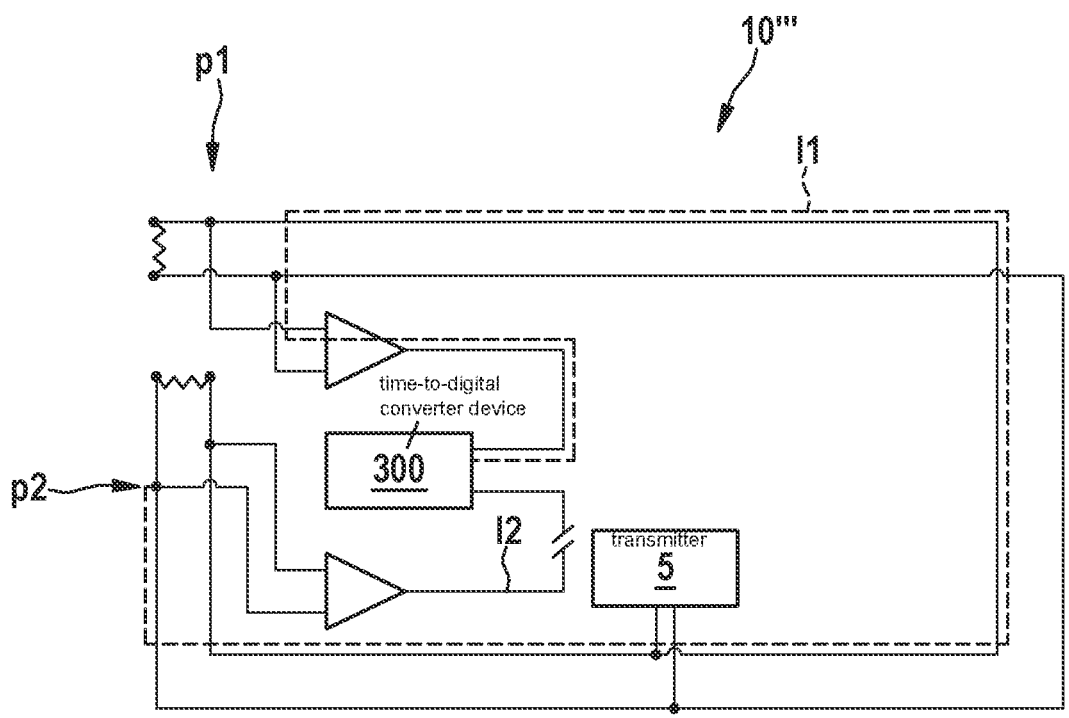
FIG. 8 shows schematically a simplified block diagram according to further exemplary embodiments of the present invention.

FIG. 8 shows schematically a simplified block diagram of a bus system 10'" according to further exemplary embodiments, which has a topology or configuration of the transmission medium differing from FIG. 7. Here, as well, in the case of additional exemplary embodiments, positions p1, p2 of the terminals of respective inputs 301, 302 (FIG. 2) of time-to-digital converter device 300 are selected in such a way that line length 11 is less than line length 12, so that, for example, a signal determinable via shorter line length 11 may provide the START signal and a signal determinable via longer line length 12 may provide the STOP signal.

Figure 9:
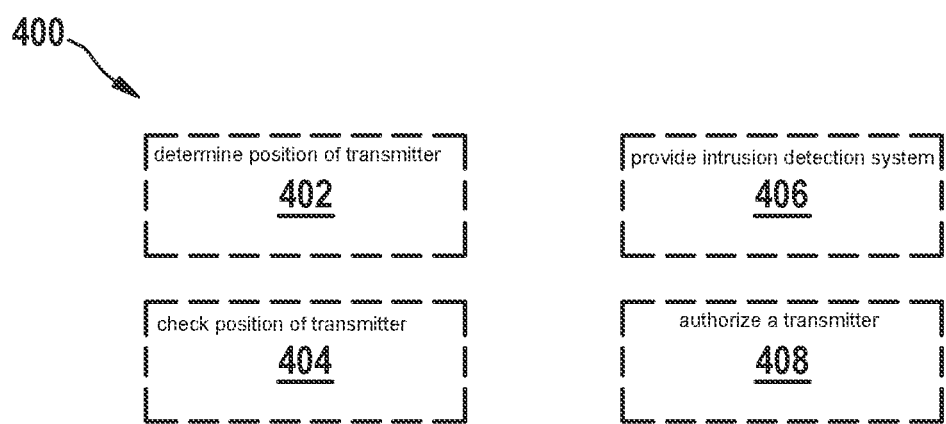
FIG. 9 shows schematically aspects of utilizations according to further exemplary embodiments of the present invention.

Further exemplary embodiments (see FIG. 9) relate to a utilization 400 of the method according to the specific embodiments and/or device 200, 200' according to the specific embodiments and/or computer-readable storage medium SM according to the specific embodiments and/or computer program PRG according to the specific embodiments and/or data-carrier signal DCS according to the specific embodiments for at least one of the following elements: a) Determining 402 a position pS (FIG. 2) of a transmitter 5 of bus system 10; b) checking 404 (FIG. 9) a position pS of a transmitter 5 of bus system 10 (e.g., by comparison with reference data RD or a model M); c) providing 406 an intrusion detection system and/or intrusion detection and prevention system; d) authenticating 408 a transmitter 5 of bus system 10.

What is claimed is:

1. A computer-implemented method for determining information of a bus system that has a transmission medium via which signals are transmittable by a plurality of transmitters that are located at different respective positions of the transmission medium, the method comprising the following steps:

using at least one time-to-digital converter device to determine a first variable which characterizes a time difference between (a) a first point in time at which a signal output by a first one of the plurality of bus transmitters onto the transmission medium reaches a first position relative to the transmission medium from the respective position at which the first one of the plurality of transmitters is located and (b) a second point in time at which the signal output by the first one of the plurality of bus transmitters onto the transmission medium reaches a second position relative to the transmission medium; and evaluating the first variable, wherein the evaluating includes at least one of the following two evaluations (a)-(b):

(a) identifying the position of the transmission medium at which the first one of the plurality of bus transmitters is located based on an actual value of the first variable, different predefined values of the first variable being predefined as corresponding to the different respective positions; and (b) with respective predefined associations of the different predefined values of the first variable with respective ones of the plurality of transmitters, comparing the actual value of the first variable to the respective one of the predefined values that has been predefined as being associated with the first one of the plurality of bus transmitters.

2. The method as recited in claim 1, further comprising: at least temporarily connecting a first input of the time-to-digital converter device to the transmission medium at the first position, and at least temporarily connecting a second input of the time-to-digital converter device to the transmission medium at the second position.

3. The method as recited in claim 2, wherein the first input is a START input and the second input is a STOP input.

4. The method as recited in claim 1, wherein the at least one time-to-digital converter device includes at least two time-to-digital converter devices, the at least two time-to-digital converter devices being used to determine the first variable.

5. The method as recited in claim 1, further comprising: evaluating information characterized by the signal.

6. The method as recited in claim 5, wherein the evaluating of the information includes extracting information of a message characterized by the signal.

7. The method as recited in claim 1, further comprising:
(a) at least one of detecting and preventing an intrusion based on the first variable or (b) authenticating the transmitter based on the first variable.

8. The method as recited in claim 1, wherein:
the different predefined values of the first variable are predefined as corresponding to the different respective positions; and
the evaluating includes the identifying of the position of the transmission medium at which the first one of the plurality of bus transmitters is located based on the actual value of the first variable.

9. The method as recited in claim 1, further comprising determining that the first one of the plurality of bus transmitters is an unauthorized transmitter based on the identification of the position.

10. The method as recited in claim 1, further comprising determining that the first one of the plurality of bus transmitters is unauthorized for transmission of a message included in the signal based on a combination of the identification of the position and an evaluation of the message.

11. The method as recited in claim 1, wherein:
the different predefined values of the first variable have the respective predefined associations with the respective ones of the plurality of transmitters; and
the evaluating includes the comparing of the actual value of the first variable to the respective one of the predefined values that has been predefined as being associated with the first one of the plurality of bus transmitters.

12. The method as recited in claim 11, further comprising:
in response to a result of the comparison being that there is an insufficient match, performing a system intrusion treatment process.

13. A computer-implemented method for determining information of a bus system that has a transmission medium via which signals are transmittable, the method comprising:
outputting a common start signal to a first time-to-digital converter device and to a second time-to-digital converter device, wherein a second input of the first time-to-digital converter device is at least temporarily connected to the transmission medium at a first position relative to the transmission medium and a second input of the second time-to-digital converter device is at least temporarily connected to the transmission medium at a second position relative to the transmission medium;
using the first and second time-to-digital converter devices to determine a first variable which characterizes a time difference between (a) a first point in time at which a signal output by a transmitter onto the transmission medium reaches the first position and (b) a second point in time at which the signal output by the transmitter onto the transmission medium reaches the second position; and
evaluating the first variable.

14. The method as recited in claim 13, wherein the second input of the first time-to-digital converter device is a STOP input and wherein the second input of the second time-to-digital converter device is a STOP input.

15. A computer-implemented method for determining information of a bus system that has a transmission medium via which signals are transmittable, the method comprising:
determining a first variable which characterizes a time difference between (a) a first point in time at which a signal output by a transmitter onto the transmission medium reaches a first position relative to the transmission medium and (b) a second point in time at which the signal reaches a second position relative to the transmission medium; and
determining, based on the first variable and on information characterized by the signal, whether the transmitter of the signal is a device authorized to communicate over the bus system.

16. The method as recited in claim 15, further comprising:
in response to a result of the authorization determination being that the transmitter of the signal is not a device authorized to communicate over the bus system, initiating at least one countermeasure.

17. The method as recited in claim 16, wherein the countermeasure includes preventing and/or declaring invalid a transmission of the transmitter.

18. A device configured to determine information of a bus system that has a transmission medium via which signals are transmittable by a plurality of transmitters that are located at different respective positions of the transmission medium, the device configured to:
use at least one time-to-digital converter device to determine a first variable which characterizes a time difference between (a) a first point in time at which a signal output by a first one of the plurality of bus transmitters onto the transmission medium reaches a first position relative to the transmission medium from the respective position at which the first one of the plurality of transmitters is located and (b) a second point in time at which the signal output by the first one of the plurality of bus transmitters onto the transmission medium reaches a second position relative to the transmission medium; and
evaluate the first variable, wherein the evaluating includes at least one of the following two evaluations (a)-(b):
(a) identifying the position of the transmission medium at which the first one of the plurality of bus transmitters is located based on an actual value of the first variable, different predefined values of the first variable being predefined as corresponding to the different respective positions; and
(b) with respective predefined associations of the different predefined values of the first variable with respective ones of the plurality of transmitters, comparing the actual value of the first variable to the respective one of the predefined values that has been predefined as being associated with the first one of the plurality of bus transmitters.

19. A non-transitory computer-readable storage medium on which are stored commands for determining information of a bus system that has a transmission medium via which signals are transmittable by a plurality of transmitters that are located at different respective positions of the transmission medium, the commands, when executed by a computer, causing the computer to perform the following steps:
using at least one time-to-digital converter device to determine a first variable which characterizes a time difference between (a) a first point in time at which a signal output by a first one of the plurality of bus transmitters onto the transmission medium reaches a first position relative to the transmission medium from the respective position at which the first one of the plurality of transmitters is located and (b) a second point in time at which the signal output by the first one of the plurality of bus transmitters onto the transmission medium reaches a second position relative to the transmission medium; and
evaluating the first variable, wherein the evaluating includes at least one of the following two evaluations (a)-(b):
(a) identifying the position of the transmission medium at which the first one of the plurality of bus transmitters is located based on an actual value of the first variable, different predefined values of the first variable being predefined as corresponding to the different respective positions; and
(b) with respective predefined associations of the different predefined values of the first variable with respective ones of the plurality of transmitters, comparing the actual value of the first variable to the respective one of the predefined values that has been predefined as being associated with the first one of the plurality of bus transmitters.

* * * * *